United States Patent [19]

Frazier

[11] Patent Number: 4,486,646
[45] Date of Patent: Dec. 4, 1984

[54] APPARATUS FOR GENERATING RAMP VOLTAGE FOR USE WITH ARC WELDER

[76] Inventor: Robert F. Frazier, 3129 Franklin, San Francisco, Calif. 94123

[21] Appl. No.: 364,173

[22] Filed: Apr. 1, 1982

[51] Int. Cl.³ .................................................. B23K 9/10
[52] U.S. Cl. ............................ 219/130.1; 219/130.5; 328/181
[58] Field of Search ............ 219/130.1, 130.31, 130.32, 219/130.33, 130.5, 130.51, 137 PS; 328/181, 185

[56] References Cited

U.S. PATENT DOCUMENTS

| | | | |
|---|---|---|---|
| 3,047,820 | 7/1962 | Lawton | 328/185 |
| 3,859,603 | 1/1975 | Herzner | 328/181 |
| 3,950,706 | 4/1976 | Wilson | 328/181 |
| 4,016,498 | 4/1977 | Hadley | 328/185 |
| 4,220,927 | 9/1980 | Austin | 328/181 |
| 4,301,355 | 11/1981 | Kimbrough et al. | 219/130.33 |

*Primary Examiner*—C. C. Shaw
*Attorney, Agent, or Firm*—Townsend and Townsend

[57] ABSTRACT

Apparatus and a method for generating a ramp voltage for use as a control signal in the electrode circuit of an arc welder. The generator includes an integrator whose input is coupled to a current generator by a switching network controlled by switch logic responsive to the output voltage of the integrator itself. The current generator supplies negative and positive currents alternately to the input of the integrator as a function of the actuation of the switching network so that a ramp voltage characteristic can be obtained in which the ramp voltage, once it reaches a maximum value, will fluctuate at a frequency above 20 kHz between upper and lower limits on either side of a mean value such that the mean value will be constant over time. The output voltage of the integrator is compared with an adjustable reference voltage and the result of the comparison is to provide signals applied to the switching network to ultimately cause negative and positive currents from the current generator to be applied to the integrator at a relatively high frequency, such as a frequency of 50 kHz. One of the signals is amplified to decrease the response time of switching from a first current to the second current and bias means is provided to decrease the response time in switching back from the second current to the first current.

9 Claims, 5 Drawing Figures

APPARATUS FOR GENERATING RAMP VOLTAGE FOR USE WITH ARC WELDER

This invention relates to voltage generating techniques adaptable for arc welding purposes and, more particularly, to apparatus and a method for generating a ramp voltage for use as a control signal to control current to the electrode of an arc welder.

BACKGROUND OF THE INVENTION

In the practice of arc welding, it is extremely important that the welding current delivered to a weld electrode be substantially constant for a number of different reasons. Primarily, the current must be kept constant to prevent variations in the strength and integrity of the weld formed by the arc between the electrode and a workpiece. Unless the current is kept at a substantially constant value, the weld itself could be substantially weakened to the point that the weld could fail and cause serious damage to the structure or apparatus in which the weld is made and also cause personal injury where individuals are affected as the result of the failed weld.

The use of ramp voltages for controlling the current flow to a welding electrode of an arc welder has been known and practiced in the past. Ramp voltages generated for this purpose by conventional equipment are generally kept within a certain band of voltages; however, the ramp voltage, although held within such a band, drifts upwardly and downwardly within the band so that the net result is not a fixed, uniform voltage value but rather a generally continuously varying value. What this means in terms of electrode or welding current is that the current also drifts upwardly and downwardly. The reason for this drift is that, for a relatively small change of the ramp voltage, there is a corresponding increase or decrease in welding current which is relatively large, of the order of 2 to 5 amperes. Such a change in the welding current results in undesirable welds which are not uniform and give rise to structural defects of the type described above.

Conventional equipment for generating ramp voltages is complex in construction, expensive to produce and to maintain, and operates to cause drifts in the ramp voltage as described above. A typical ramp voltage generator of conventional construction includes an integrator which provides an upramp voltage and a downramp voltage and an amplifier for providing a ramp voltage of a substantially uniform value. However, switching from the integrator to the amplifier causes an error to be generated in the voltage, and this error requires frequent calibration of the output voltage of the generator, a time-consuming and expensive procedure. Thus, the ramp voltage generators of conventional construction do not provide a constant ramp voltage which can control the welding current in a manner to assure a weld of high quality and one which can withstand loads and other stresses without failure.

An off-the-shelf precision voltage source is not usable as a ramp voltage generator because it has no capability for generating upramp and downramp voltages. Such a voltage source would have to be extensively modified and the result would be a voltage source substantially the same as the conventional ramp voltage generator described above.

Because of the drawbacks of conventional ramp voltage generators and precision voltage sources, a need has arisen for improvements in techniques which provide for the generation of ramp voltages which can be used with an arc welder to assure a substantially uniform welding current to an electrode for generating a welding arc.

SUMMARY OF THE INVENTION

The present invention fills the aforesaid need by providing apparatus and a method for generating a ramp voltage which permits the voltage itself, once it has reached the maximum ramp voltage, to fluctuate in a manner so that the net effect of the fluctuations will, for all practical purposes, result in a constant voltage even though the voltage itself fluctuates above and below the resulting required mean voltage. This ramp voltage so generated is especially suitable for use in controlling the current delivered to an electrode of an arc welder so that the control achieved by the use of the ramp voltage results in electrode current which is substantially uniform. As a result, the welding electrode current through the arc will be essentially uniform at all times to provide a weld of high structural integrity.

To this end, the apparatus and method of the present invention includes an integrator which generates a positive ramp voltage when a capacitor across the integrator is charged and generates a negative ramp voltage when the capacitor is discharged. During the time that the capacitor is charged and discharged, the charging current is supplied by a pair of current sources. Such current is controlled by a pair of switches which alternately open and close at a relatively high frequency. The net effect of this current control is that the capacitor tends to discharge when the first switch is closed and the second opened and to charge when the first switch is closed and the second switch is opened.

The two switches are controlled by circuitry including a comparator which compares the ramp voltage at the output of the integrator with an adjustable reference voltage. The output of the comparator is fed to switch logic coupled to the first switch and also to switch logic coupled to the second switch. A high gain switch driver is coupled between the comparator and the switch logic of the first switch, the second switch normally being open, so that, due to the high gain switch driver, the second switch is quickly closed when the output of the comparator is a given value.

The switch logic circuitry coupled to the two switches is operated at a high frequency, such as a frequency of 50 kHz, which causes the maximum ramp voltage to fluctuate only minutely, such as 0.03 v. above and below a desired reference voltage, such as about 10 v. when used as the ramp voltage signal for controlling electrode current in an arc welder.

As the control signal for an arc welder, the ramp voltage has a much higher frequency than the response time of the weld current control of the arc welder which responds to the ramp voltage and controls the welding current to the electrode. Thus, statistically, the ramp voltage, when used as a control signal for controlling welding current, is essentially a d.c. voltage of uniform, non-varying value notwithstanding the high frequency fluctuations of the ramp voltage As a result, the essentially non-varying ramp voltage controls the welding current in such a manner that the welding current is, for all practical purposes, a constant value. This results in a welding arc which provides a desired weld with high structural integrity so as to avoid the problems associated with the practices of welding techniques using conventional ramp voltage generating equipment.

The primary object of the present invention is to provide an improved apparatus and method for generating a ramp voltage wherein the voltage itself, once it reaches a maximum value, fluctuates only minutely but at high frequency in a manner such that the mean or average voltage value of the ramp voltage is a substantially constant notwithstanding its fluctuations and even though the apparatus is remotely located from the electrode, so that the ramp voltage is suitable for use as a control signal for controlling the current to the welding electrode of an arc welder.

Another object of the present invention is to provide apparatus and a method of the type described wherein the mean or average value of the ramp voltage is maintained constant by alternately charging and discharging a capacitor across an integrator after the capacitor has been charged to the maximum ramp voltage so that the control of the charging and discharging of the capacitor is done in a manner to cause the algebraic sum of the positive and negative peaks of the fluctuation ramp voltage to be a constant and to provide a relatively constant frequency of the ramp voltage fluctuations.

Still another object of this invention is to provide apparatus and a method of the aforesaid character wherein the charging and discharging of the capacitor is controlled by a pair of switches coupled to respective current sources which supply positive and negative currents to the integrator and wherein the switches themselves are controlled by switch logic responsive to the output signal of a comparator having a hysteresis band and whose inputs are the ramp voltage itself and a known reference voltage, whereby the charging and discharging of the capacitor which cause the fluctuations of the ramp voltage occur at a relatively constant frequency so that the net effect is a ramp voltage having a uniform value, i.e., a d.c. value, notwithstanding the fluctuations of the ramp voltage.

Other objects of this invention will become apparent as the following specification progresses, reference being had to the accompanying drawings which illustrate in schematic and graphic form the teachings of the present invention.

IN THE DRAWINGS

Figure 1:
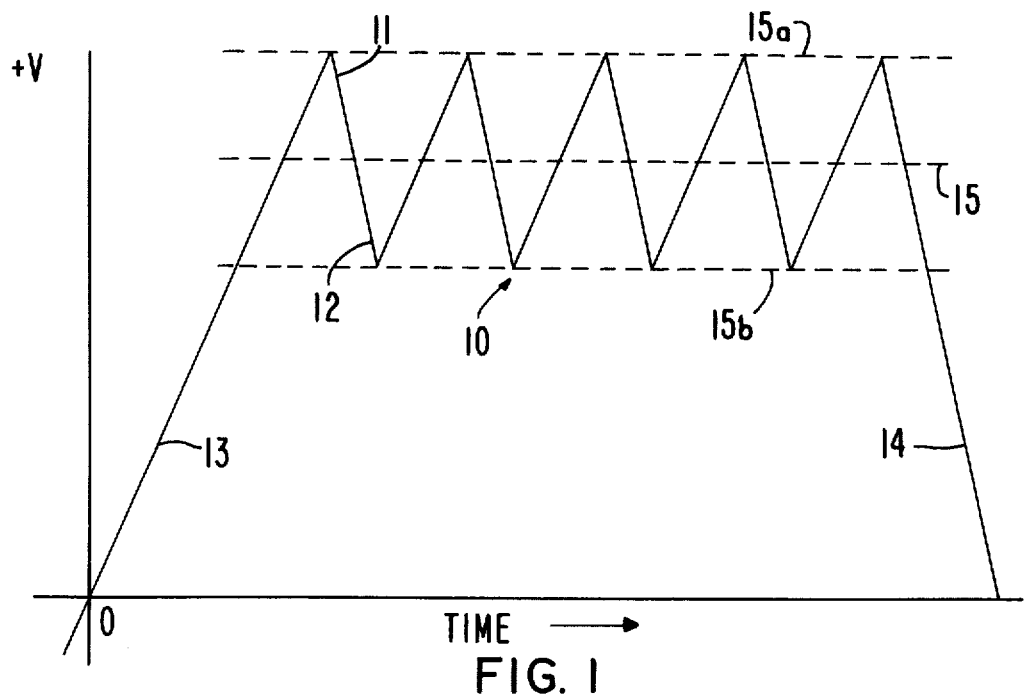
FIG. 1 is a graphic view of a ramp voltage capable of being generated with the practice of the teachings of the present invention.

The apparatus of the present invention as hereinafter described, is adapted to operate to generate a ramp voltage shown by curve 10 of FIG. 1. This ramp voltage is usable as a control signal for controlling welding current to an electrode of an arc welder. Such an arc welder is shown and described in more detail in FIG. 5.

Curve 10 has a fluctuating portion comprised of a high frequency variation of the maximum ramp voltage value during the time in which the apparatus of this invention is operating. These fluctuations provide positive and negative peaks as shown in FIG. 1. Curve 10 further includes an upramp portion 13 and a downramp portion 14, upramp portion 13 being generated when the apparatus is caused to commence operation and downramp portion 14 is generated when the apparatus is shut down.

A distinguishing feature of curve 10 is the steep downslope of the curve between the upper value of the positive peaks 11 to the lower value of the negative peaks 12 at the required ramp voltage. This downslope may or may not be equal to the upslope from the bottom of the negative peaks 12 to the top of the positive peaks 11 so as to provide a symmetrical waveform but not a true sawtooth wave. In practice, these two slopes are not equal, but they could be equal if desired by a proper selection of circuit components.

Another distinguishing feature of curve 10 is that the positive and negative peaks have upper limits and lower limits, respectively, which remain substantially constant as determined by the hysteresis of a comparator to be described so that the peaks, over time, result in a constant mean voltage defined by line 15 between the upper limit 15a and a lower limit 15b. This mean voltage defined by line 15 is, in effect, a d.c. voltage, and this is the voltage which is used as a control signal with an arc welder in a manner to be described for controlling the electrode current of the arc welder. Thus, the current is substantially uniform at all times, and the resulting weld will have high structural integrity.

Figure 2:
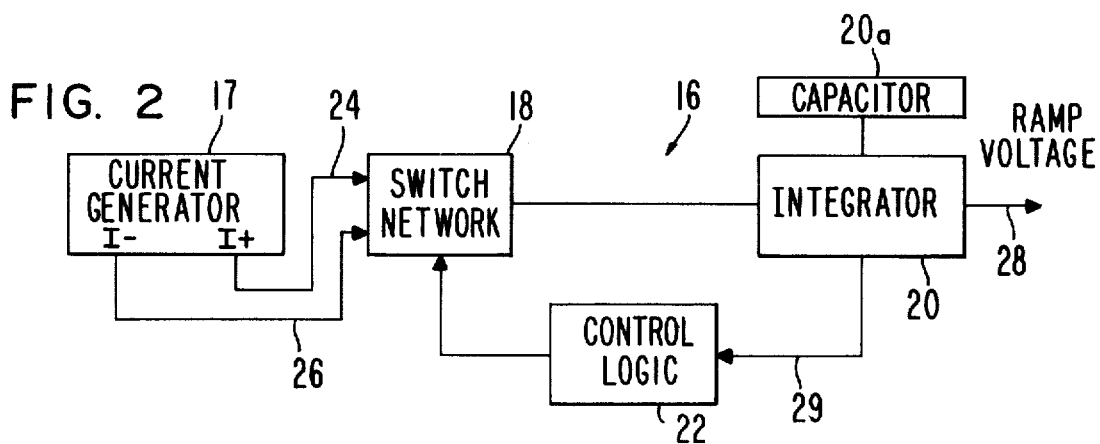
FIG. 2 is a block diagram of the apparatus of the invention showing the control logic coupling an integrator with a switch network through a feedback loop for causing high frequency fluctuations of the ramp voltage in the manner shown in FIG. 1.

The ramp voltage generator of the present invention is broadly denoted by the numeral 16 and is shown in block form in FIG. 2. Generator 16 includes a current generator 17 of any suitable construction which has two outputs, a first output being a negative current to a switch network 18 by way of line 26 and a second output being a positive current to switch network 18 by way of line 24.

The output of switch network 18 is coupled with an integrator 20 having a capacitor 20a across it which charges and discharges as the negative and positive currents from current generator 17 flow alternately through the integrator. As the capacitor charges due to the negative current flow to the integrator, the upramp portion 13 of curve 10 (FIG. 1) is generated and continues to generate until the curve 10 approaches the upper limit 15a (FIG. 1). Then, the switch network 18 is actuated by logic means to be described to stop the flow of negative current to the integrator 20 and to commence the flow of positive current to the integrator 20, whereupon the capacitor 20a discharges until the curve approaches the lower limit 15b, whereupon switch network 18 is again actuated by the above-mentioned logic means to charge the capacitor again.

This process of charging and discharging of the capacitor is controlled by control logic 22 discussed in more detail with reference to FIGS. 3 and 4, but it is important to note that this process continues at a high frequency, such as a frequency of about 50 kHz to generate the positive and negative peaks of FIG. 1 so as to provide for the constant mean value of the ramp voltage as indicated by line 15 of FIG. 1. Generally, the elements of ramp voltage generator 16 are presently in existence except for control logic 22 in combination with integrator 20 and switch network 18. By virtue of control logic 22, the high speed, sharp fluctuations defined by the positive and negative peaks of FIG. 1 are achieved as described hereinafter.

Figure 3:
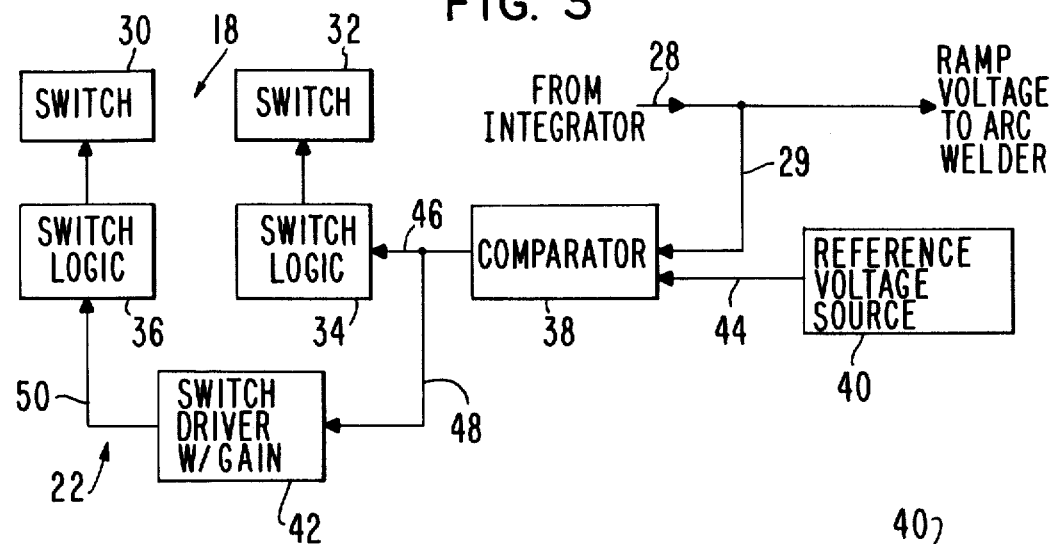
FIG. 3 is a block diagram of the control logic of FIG. 2.

Switch network 18 (FIG. 2) is shown in FIG. 3 as comprising two toggle switches 30 and 32, switch 30 being for use with positive current from generator 17 (downslope voltage), and switch 32 is for negative current from generator 17 (upslope voltage). Switch 32 is controlled by switch logic 34, switch 30 is controlled by switch logic 36, and switch logic 36 is coupled to a comparator 38 by a switch driver 42 having a gain for a purpose to be described. An adjustable voltage reference source 40 is coupled to one input of comparator 38, the other input to the comparator being by way of line 29, which is coupled to line 28, the output of integrator 20 (FIG. 2). Comparator 38 has a hysteresis which determines the band width defined by upper and lower ramp voltage limits 15a and 15b (FIG. 1).

The output of comparator 38 is connected by line 46 to switch logic 34, and the output of comparator 38 is also coupled by line 48 to switch driver 42. A line 50 interconnects switch logic 36 and switch driver 42.

Figure 4:
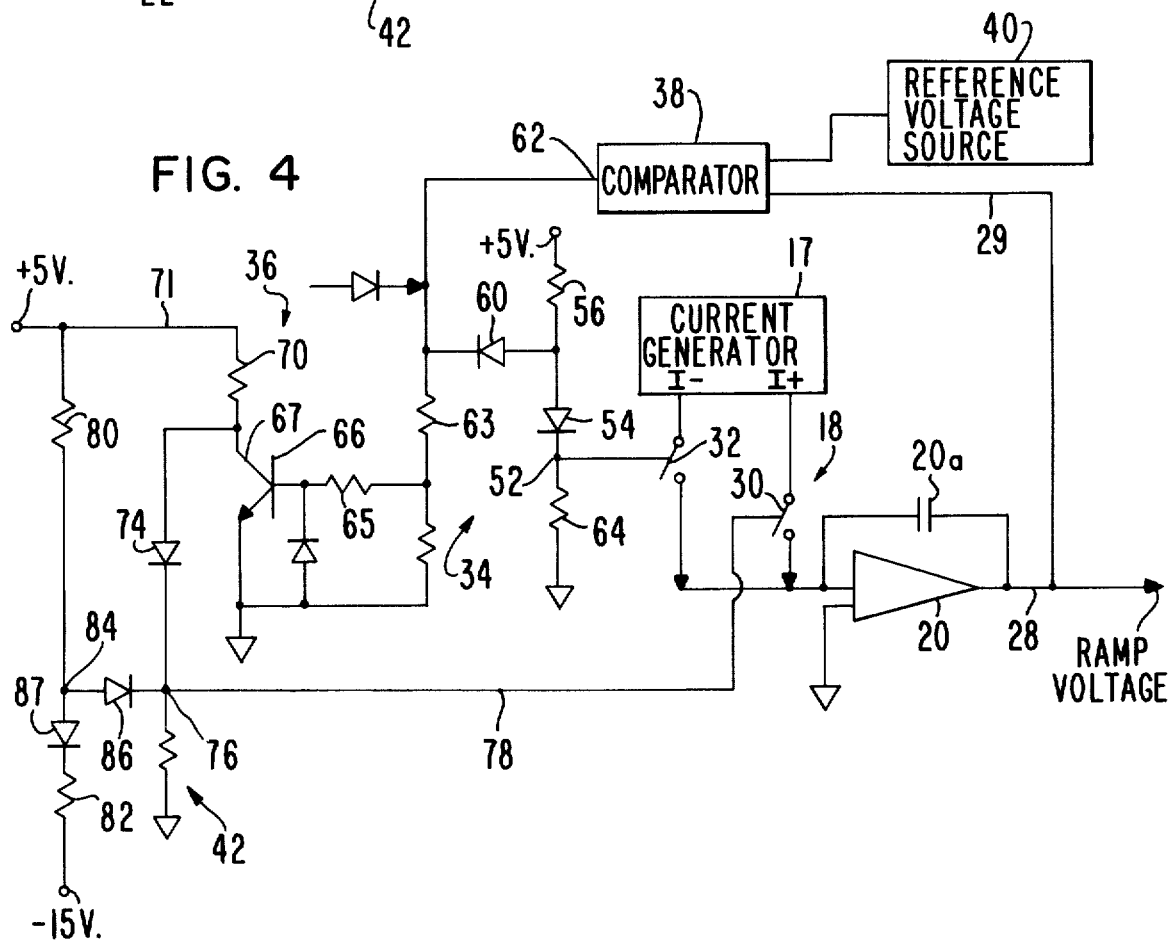
FIG. 4 is a schematic diagram of the elements of the control logic shown in FIG. 3.

Switch driver 42 is shown in more detail in FIG. 4 with reference to the circuitry of switch logic 36, switch network 18 and integrator 20 (FIG. 2). Switch 32 of network 18 (FIG. 2) is normally closed and is opened when the voltage at point 52 goes high. Point 52 is coupled through a diode 54 and a resistor 56 to a positive voltage source, such as positive 5 v. Resistor 56 is coupled through a diode 60 to the output 62 of comparator 38, one input of the comparator being coupled by line 29 from the output of integrator 20 and another input to the comparator 38 being from the reference voltage source 40. During the time in which the ramp voltage is increasing, such as during the upramp portion 13 and during the rise of the ramp voltage from the lower level 15b to the upper level 15a, the output of comparator 38 will be negative so that point 52 will be low, keeping switch 32 closed. During the time in which the ramp voltage falls, such as between levels 15a and 15b and during the downramp of the voltage along downramp portion 14 (FIG. 1), the output of comparator 38 is positive, which allows point 52 to go high, and switch 32 will be open. Point 52 is above ground by a resistor 64 as shown in FIG. 4.

Switch 30 (FIG. 4) is closed as follows:

The output 62 of comparator 38 is coupled through a pair of resistors 63 and 65 to the base 66 of a transistor amplifier 68 which has a collector 67 coupled by a resistor 70 and line 71 to a positive voltage source providing a voltage such as positive 5 v. The emitter of transistor amplifier 68 is coupled to ground, and the collector is coupled by a diode 74 to a point 76 which, by lead 78, is coupled with switch 30. When the voltage at point 76 is high, switch 30 is open. This condition occurs when switch 32 is closed, i.e., when the voltage at point 52 is low. This condition occurs when the output of comparator 38 is negative.

When the output of comparator 38 is positive, point 76 goes low and point 52 goes high, and switch 30 is closed. This closure of switch 30 is done at a high rate because transistor amplifier 68 has a high gain, such as 100 or more, so that the negative going portion of the positive peaks of curve 10 (FIG. 1) are very steep. As the ramp voltage approaches level 15b, switch 30 will open, and switch 32 will close because point 52 will start to go low, and point 76 will start to go high. This is due to the change in the polarity of the output of comparator 38 because, during the negative going portion of the ramp voltage, capacitor 20a is discharging, so that the positive voltage input to the comparator, from the integrator, is decreasing in value.

The net effect of the opening and closing of switches 30 and 32 is the rapid fluctuations of ramp voltage occur as shown in FIG. 1 which, in turn, results in the generation, in effect, of the constant ramp voltage identified by line 15 of FIG. 1. The high frequency of the ramp voltage fluctuations is achieved by biasing point 76 (FIG. 4) by a voltage source which, for purposes of illustration, includes resistors 80 and 82 and diode 87 coupled to a point 84 which is connected by a diode 86 to point 76.

One end of resistor 80 is coupled to a positive 5 v. source such as at terminal 72, and the other resistor 82 is coupled to a negative voltage source. Resistors 80 and 82 are selected in value so that point 84 is negative in voltage with respect to the voltage at point 76 when point 76 is high and is positive with respect to the voltage at point 76 when point 76 is low, i.e., when switch 30 is closed. When this condition occurs, switch 30 opens and closes at a high rate because the voltage at point 76 has a maximum value typically of 5 v. whereas, the voltage at point 84 is typically at about 1.3 v. Thus, the voltage source defined by the voltage divider having resistors 80, 82 and diode 87 provides a bias voltage to open and close switch 30 at a fast rate so that the high frequency of the high fluctuations of the ramp voltage is achieved.

Figure 5:
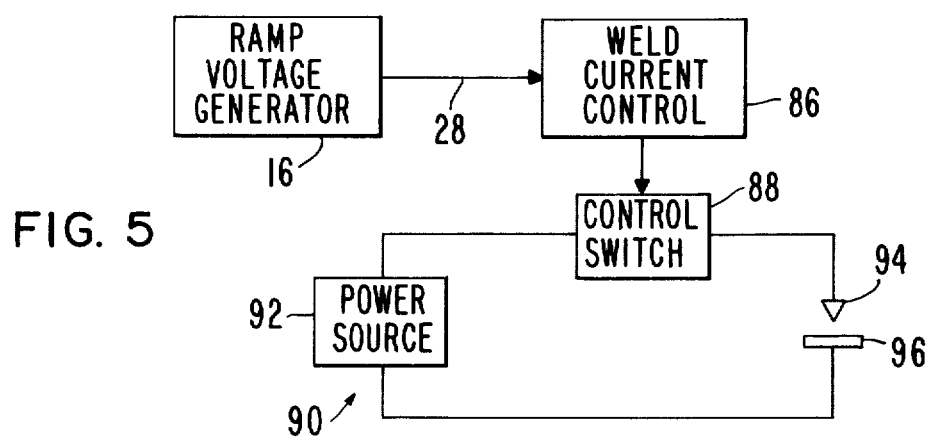
FIG. 5 is a block diagram showing the way in which the apparatus of the present invention is coupled with an arc welder.

As a particular application of the ramp voltage generated by apparatus 16, reference is made to FIG. 5 which shows ramp generator 16 coupled by line 28 to a conventional weld current control 86. Control 86 is coupled to a control switch 88 in the circuit of an arc welder 90 containing a power source 92 and an electrode 94 for welding a workpiece 96 in some fashion. The ramp voltage from generator 16 is compared, using a comparator (not shown) in control 86, with the voltage across a resistor (not shown) in the welding electrode circuit and the output of the comparator is used to vary the width of a pulse width modulated signal generated in weld current control 86. This signal is used to operate a transistor bank forming control switch 88 so that, by varying the pulse width of such signal, the duty cycle of the electrode current can be changed to assure a substantially uniform electrode current over time.

The ramp voltage generated by ramp voltage generator 16, therefore, is used to control the electrode current in the circuit of arc welder 90 so that the current flowing to the electrode remains substantially constant such as within ±1.0% of dial setting, or 0.10 amperes, whichever is greater, even though the control cables between the power source 92 and the electrode 94 are relatively far apart such as 200 feet or more, and even though environmental changes might cause noise on the cables which would ordinarily affect the magnitude going to the electrode.

What is claimed is:

1. A ramp voltage generator for use with an arc welder comprising: an integrator having an input and an output and means for providing an upramp voltage and a downramp voltage at the output of the integrator when currents of opposite polarity are, respectively, applied to the input of the integrator; a current generator having a pair of outputs for supplying a negative current and a positive current, respectively to the input of the integrator; an actuatable switch network for alternately coupling the current outputs of the current generator to the input of the integrator; and control logic including a reference voltage source coupled with the integrator and the switch network for actuating the switch network as a function of the output voltage of the integrator and to cause said output voltage to have upramp and downramp portions and to fluctuate at a frequency and above and below the reference voltage of said source to cause the output voltage of the integrator to be a substantially constant value after said output voltage has increased from a minimum value and reached a maximum value substantially equal to said reference voltage, said control logic including a comparator having a pair of inputs and an output, said reference voltage source being coupled to one of the inputs of the comparator, the other input of the comparator being coupled to the output of the integrator, the comparator having a hysteresis characteristic defining a band width for the ramp voltage at the maximum ramp voltage value, and means coupling the output of the comparator to the switch network, said switch network including a first switch and a second switch, said control logic further including first bias means coupled with the first switch for opening the latter when the output voltage of the comparator has a first value and for closing the first switch when the output voltage of the comparator has a second value, and second bias means coupled with the second switch for closing the same when the output voltage of the comparator has said first voltage value and for opening the second switch when the output voltage of the comparator has said second voltage value.

2. A ramp voltage generator as set forth in claim 1, wherein the first bias means comprises a voltage divider having a pair of resistors in series and a diode between the resistors, the output of the comparator being coupled to the voltage divider between one of the resistors and the diode, the first switch being coupled to the voltage divider between the diode and the other resistor.

3. A ramp voltage generator as set forth in claim 1, wherein the second bias means includes an amplifier responsive to the output of the comparator for closing the second switch when the output voltage of the comparator is at said first voltage value and for opening the second switch when the output voltage of the comparator reaches the second voltage value.

4. ramp voltage generator as set forth in claim 3, wherein said amplifier has a predetermined gain to decrease the response time in which the second switch is closed.

5. A ramp voltage generator as set forth in claim 3, wherein is included third bias means coupled with said second bias means for decreasing the response time in which the second switch is opened.

6. ramp voltage generator as set forth in claim 5, wherein the third bias means includes a voltage divider for providing at least a predetermined voltage at said second switch to cause the second switch to open upon the commencement of a change of the output voltage of the comparator from the first voltage value to said second voltage value.

7. A ramp voltage generator as set forth in claim 1, wherein said reference voltage source is adjustable.

8. A ramp voltage generator as set forth in claim 1, wherein the frequency is at least 20 kHz.

9. A ramp voltage generator as set forth in claim 1, wherein the frequency is at least 50 kHz.

* * * * *

UNITED STATES PATENT AND TRADEMARK OFFICE
CERTIFICATE OF CORRECTION

PATENT NO. : 4,486,646
DATED : December 4, 1984
INVENTOR(S) : Robert F. Frazier

It is certified that error appears in the above—identified patent and that said Letters Patent is hereby corrected as shown below:

On the title page of the patent, after:

"(76) Inventor: Robert F. Frazier,
3129 Franklin, San Francisco,
Calif. 94123"

insert the following:

"(73) Assignee: Bechtel International
Corporation, San Francisco,
California 94119."

Signed and Sealed this

Twenty-third Day of July 1985

[SEAL]

Attest:

DONALD J. QUIGG

Attesting Officer    Acting Commissioner of Patents and Trademarks